United States Patent Office 3,359,275
Patented Dec. 19, 1967

3,359,275
SUBSTITUTED IMIDAZOLINES AND METHODS
FOR PRODUCING THEM
Hans S. Mannheimer, 23 Haines Cove Drive,
Toms River, N.J. 08753
No Drawing. Filed June 10, 1964, Ser. No. 374,145
6 Claims. (Cl. 260—309.6)

This invention relates to novel compounds and also to novel methods for producing them, as well as to novel compositions of matter containing one or more of said novel compounds as components thereof.

Prior to this invention I produced certain compounds disclosed in my U.S. Patent 2,773,068 of Dec. 4, 1956. The compounds therein disclosed and used as starting materials for the production of the compounds of this invention are of the following generic Formula I:

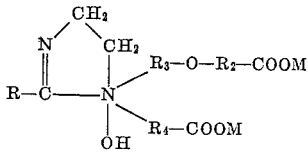

in which R is a hydrocarbon radical of 4–18 carbon atoms, $R_2$ and $R_4$ may be the same or different alkylene group of 1–6 carbon atoms and $R_3$ is an alkylene group of 2–6 carbon atoms. Thus, $R_2$ and $R_4$ are either $CH_2$, $C_2H_4$, $C_3H_6$, $C_4H_8$, $C_5H_{10}$, or $C_6H_{12}$ and each $R_3$ is either one of the last five of said groups. The aforesaid compounds may be prepared by following the teachings of said Patent 2,773,068.

According to this invention I have discovered that said compounds within said generic Formula I may be treated in a certain manner in order to obtain the compounds of this invention. Said compounds within said generic Formula I may be dissolved in an organic solvent such as ethyl alcohol, methyl alcohol or isopropyl alcohol or other suitable organic solvent in which sodium chloride is not soluble. Then to said solution is added 2 moles of hydrochloric acid for each mole of said compounds in said solution. The mass is heated to approximately 40–50° C. while being constantly stirred and so maintained for approximately one hour to assure substantially complete reaction. At the end of this period practically all of the compounds within the generic Formula I above set forth are now compounds within the following generic Formula II:

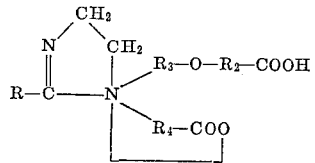

The mass is then cooled whereupon the sodium chloride by-product of reaction crystallizes out and is removed therefrom by filtration. Then the alcoholic solution is heated under atmospheric pressure conditions to a temperature of 90–100° C. and preferably maintained at 100° C. until the alcoholic solvent has been removed therefrom by vaporation. The resultant mass is maintained at a temperature between about 80° C.–100° C. for 12 to 72 hours or more depending upon the temperature employed, thereby to convert at least 50% by weight of said compounds of generic Formula II to compounds of the following generic Formula III:

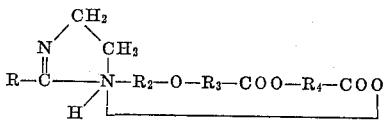

It is preferable that said heating be continued until at least 75% of said compounds of said generic Formula II are converted into said compounds of generic Formula III, or at least until the amount of sodium hydroxide necessary to increase the pH thereof to 7 is reduced by about 30%–40% of that required to so raise the pH of said mass prior to said extended heating. Said compounds within generic Formula III may be neutralized with alkali metal hydroxides or carbonates or with alkaline amines thereby to provide compounds within the following generic Formula IV:

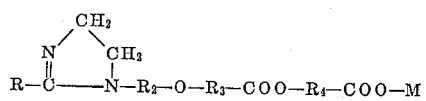

wherein M is an alkali metal and preferably sodium, potassium or lithium or is a protonated amine radical. When M is an alkali metal the compound may be defined as such metal salt of the compounds of generic Formula III, and when it is a protonated amine radical the compound may be defined as an amine addition salt of the compounds of generic Formula III. Said salts may be readily prepared by combining compounds of generic Formula III and water in equal weights and then while being at about 40–50° C. adding thereto a quantity of 50% aqueous solution of sodium hydroxide, potassium hydroxide or lithium hydroxide or of the desired amine. The quantity of hydroxide or amine added thereto is one mole thereof for each mole of compounds of generic Formula III in said aqueous medium. The resultant mass is maintained in said temperature range over a period of approximately one hour to assure complete reaction thereby to obtain the desired salt. Among some of the amines which may be employed are mono-, di-, or tri-ethanol amine which are given herein merely by way of example and not in a limiting sense. These novel salts when in aqueous solution provide solutions of higher viscosities than do the salts of generic Formula I. They also exhibit the unexpected and advantageous characteristic of maintaining in aqueous solution and prevent the graining out therefrom of the diamides which are present therein and which were formed in the course of producing the compounds of generic Formula I. The novel salts of this invention are more viscous than the compounds from which they have been derived and therefore are useful for the formulation of very high viscosity shampoos.

The following are specific examples of some of the methods for producing some of the compounds of the present invention and are given by way of illustration and not limitation.

Into a glass flask was poured 2000 grams of a 25% ethanol solution of "Miranol C2M Conc" of the following formula:

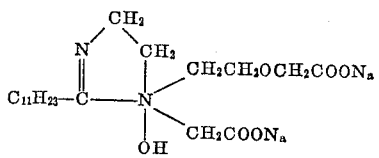

Then there was added thereto an amount of dilute hydrochloric acid sufficient to supply two moles of HCl per mole of said organic compound in said ethanol medium. While being constantly stirred the mass is heated to and maintained at a temperature in the range of 40–50° C.

for a period of one hour, thereby to convert practically all of said salt into a compound of the following formula.

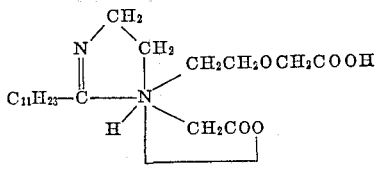

In the course of said conversion NaCl by-product was produced. At the end of said one-hour period the temperature of the mass was reduced whereupon the NaCl crystallized out. At this reduced temperature the mass was filtered to separate the NaCl therefrom and the filtrate was recovered. The filtrate was heated at a temperature of approximately 100° C. until all of the alcohol and most of the water had been evaporated therefrom. This was effected over a one-hour period. At this stage, a small sample thereof was added to a little water and a quantity of a 50% aqueous solution of caustic soda was added thereto until the pH thereof was increased to 7. The amount of caustic soda added at this stage was recorded. At this stage the mass was maintained at a temperature in the range of 80–100° C. and in this particular case at approximately 100° C. for 24 hours. At the end of this period a sample thereof was again treated with a 50% solution of a caustic, and it was found that the amount of caustic now required to increase the pH thereof to 7 was reduced by more than 25% of that first required and befor set forth. The same effect was achieved by maintaining said mass at a temperature of about 80–85° C. for 72 hours. At the end of said 24 or 72-hour period more than 50%, and in this instance, 75% to 80% of the quantity of said compound whose formula is last above set forth was converted to a compound of the following formula:

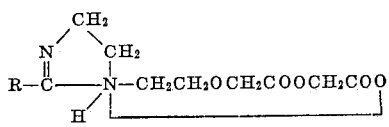

The mass is permitted to cool to 40–50° C., then an amount of water equal to the weight of said mass is added thereto. While being constantly stirred there is added to the resultant aqueous mass sufficient 50% aqueous solution of sodium hydroxide to supply thereto one mole of sodium hydroxide for each mole of said compound last above written and therein. The mass was maintained at 40–50° C. over a period of approximately one hour for a complete reaction whereby substantially all of said compound whose formula is last above written has been converted into a compound of the following formula:

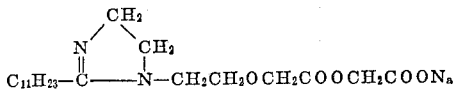

This novel salt, hereinafter called Product 1, is more viscous than the starting material "Miranol C2M Conc" from which it was derived is useful for the production of high viscosity shampoos.

Instead of employing sodium hydroxide to obtain the sodium salt shown in the formula last above written, the corresponding potassium or lithium salts may be obtained by using corresponding molecular quantities of potassium hydroxide or lithium hydroxide. Also amine addition salts of the compound penultimately set forth may be produced by following the aforesaid procedure and substituting for the sodium hydroxide a corresponding molecular proportion of a desired alkaline amine. The amines employed may be monoamines, diamines, triamines, or polyamines. Such alkaline amines are so well known in the art that no further description appears necessary. The following are some specific formulations which are useful as shampoos, which I have recommended for a considerable period prior to this invention:

|  | Parts |
|---|---|
| "Miranol C2M Conc" (approximately 40%) in water | 15–50 |
| Sodium lauryl sulfate (twenty percent) (28% active) | 15–30 |
| Hexylene glycol | 2–5 |
| Lauric-diethanolamide (highly active) | 1–10 |
| "Altas G–7596J" (optional) | 1–2 |
| Water | 56 |

The following formulations are some specific formulations of shampoos of the present invention:

Employing the same formulations as above set forth and substituting for the "Miranol C2M Conc" corresponding quantities of Product 1, or the corresponding potassium or lithium salt of Product 1, or the corresponding amine addition salt, there may be produced novel shampoo formulations of this invention which have greater viscosities than those above set forth.

While the present invention has been described in detail, it is to be understood that it is not to be limited thereby.

I claim:
1. A compound selected from the group of compounds within the following generic formula:

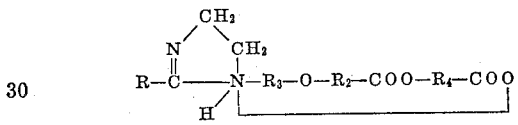

wherein
R is a hydrocarbon radical of 4–18 carbon atoms;
each $R_2$ and $R_4$ are the same or different alkylene radical of 1–6 carbon atoms; and
$R_3$ is an alkylene radical of 2–6 carbon atoms.

2. A compound of the formula:

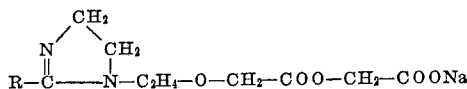

R being a hydrocarbon radical of 4–18 carbon atoms.

3. An amine addition salt selected from the group consisting of mono-, di- and tri-ethanol amine addition salts of:

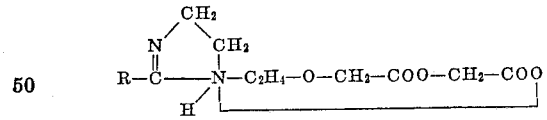

R is a hydrocarbon radical of 4–18 carbon atoms.

4. The method comprising maintaining a mass of a compound of the formula:

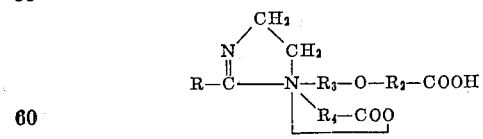

in the temperature range of 80°–100° C. for 12–72 hours;
R is a hydrocarbon radical of 4–18 carbon atoms;
each $R_2$ and $R_4$ are the same or different alkylene radical of 1–6 carbon atoms; and
$R_3$ is an alkylene radical of 2–6 carbon atoms.

5. The method comprising maintaining at 80°–100° C. a quantity of a compound of the formula (A):

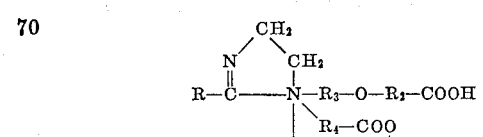

until at least 50% thereof has been converted into a compound whose structural formula (B) is:

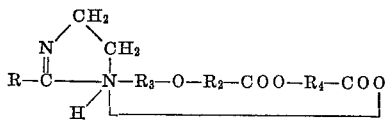

R is a hydrocarbon radical of 4–18 carbon atoms;
each $R_2$ and $R_4$ are the same or different alkylene radical of 1–6 carbon atoms; and
$R_3$ is an alkylene radical of 2–6 carbon atoms.

6. An alkali metal salt of a compound defined in claim 1.

References Cited

UNITED STATES PATENTS

| | | | |
|---|---|---|---|
| 2,209,314 | 7/1940 | Baker | 260—525 |
| 3,133,816 | 5/1964 | Ben-Ezra | 260—534 |

OTHER REFERENCES

Noller: Chemistry of Organic Compounds, 2nd ed., pp. 150–1, Philadelphia, Saunders, 1957.

WALTER A. MODANCE, *Primary Examiner.*

N. TROUSOF, *Assistant Examiner.*